UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

PROCESS OF MAKING HYDROCYANIC ACID.

967,943. Specification of Letters Patent. Patented Aug. 23, 1910.

No Drawing. Application filed April 16, 1910. Serial No. 555,953.

*To all whom it may concern:*

Be it known that I, OTTO LIEBKNECHT, a subject of the Emperor of Germany, and a resident of Frankfort-on-the-Main, Germany, have invented certain new and useful Improvements in the Process of Making Hydrocyanic Acid, of which the following is a specification.

This invention relates to the process of making hydrocyanic acid in a manner more expeditious and cheaper than heretofore.

It is known that hydrocyanic acid can be made by heating a mixture of ammonia and carbon hydrogen compounds to a high temperature, but good technical yields have not been obtained in this manner.

I have discovered that ammonia heated together with alkylamins gives satisfactory yields of hydrocyanic acid.

It is known that if alkylamins are heated, especially trimethylamin which has principally to be considered from a technical standpoint, to a temperature high enough to dissociate it, formation of hydrocyanic acid takes place, the molecule however being split up principally into methane, carbon and hydrogen in accordance with the equation

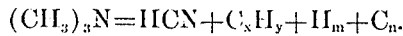

If ammonia is mixed with the trimethylamin, the trimethylamin is not only converted practically quantitatively into hydrocyanic acid, but the ammonia also is converted into the same with very good yields in accordance with the equation

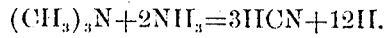

Under favorable conditions yields can be obtained which are not very far from the theoretically possible. This conversion of ammonia into hydrocyanic acid with good yields is apparently caused by the fact that the carbon hydrogen compounds generated through the decomposition of trimethylamin, react *in statu nascendi* more energetically on the ammonia than if they were admixed directly with the ammonia as hitherto practiced. The carbon hydrogen compounds which are formed by the decomposition of trimethylamin therefore find, through the conversion of the ammonia into hydrocyanic acid, a very serviceable use, while hitherto they have only been used at best, for fuel purposes. The heating of the mixture may take place in various ways. For instance by passing the gas mixture through tubes which are heated directly or indirectly to the temperature required. A temperature of about red heat and above has proven to give good results. The degree of temperature, which is required for carrying out the process, depends partly upon the velocity with which the gases are conducted over the heating furnaces.

I am aware that a process has been published for producing hydrocyanic acid by heating alkylamins to red heat, whereby the alkylamins shall be decomposed into ammonia, inflammable gases and hydrocyanic acid. This formation of ammonia can only be based, according to the nature of the compounds in question, upon not sufficiently heating the alkylamins or it may be a secondary reaction, as for instance saponification of already formed hydrocyanic acid. The formation of hydrocyanic acid represents a simpler reaction than the formation of ammonia, because the union already present between carbon and nitrogen remains intact. If on the other hand the reaction takes place at sufficiently high temperature then the formation of free ammonia in any considerable quantities is not possible as only hydrocyanic acid and inflammable carbon containing gases are generated, these gases containing, in case trimethylamin is used, two atoms of carbon whereas only one carbon atom is contained in the hydrocyanic acid. My process is based just upon this latter circumstance: To the alkylamin to be treated so much ammonia is added that the excess of carbon can combine with the ammonia to form hydrocyanic acid, the inflammable carbon containing gases reacting upon the ammonia *in statu nascendi*.

In my process I do not use small quantities of ammonia formed only through the reaction, but I purposely add comparatively large quantities of ammonia in order to convert the same as described into hydrocyanic acid.

What I claim is this:
1. The process of making hydrocyanic acid consisting in heating a mixture of an arylamin and ammonia.
2. The process of making hydrocyanic acid consisting in heating a mixture of methylamin and ammonia.

In testimony whereof I have signed this specification in the presence of two subscribing witnesses.

OTTO LIEBKNECHT.

Witnesses:
 FRANZ HASSLACHER,
 ERWIN DIPPEL.